United States Patent [19]

Shirayama et al.

[11] 4,031,062

[45] June 21, 1977

[54] POLYOLEFIN COMPOSITION AND PROCESS FOR PREPARING THE SAME

[75] Inventors: Kenzo Shirayama; Shinichiro Kita; Masanori Fujimoto, all of Ehime, Japan

[73] Assignee: Sumitomo Chemical Company, Limited, Osaka, Japan

[22] Filed: Sept. 26, 1974

[21] Appl. No.: 509,591

Related U.S. Application Data

[63] Continuation-in-part of Ser. No. 287,167, Sept. 7, 1972, abandoned.

[30] Foreign Application Priority Data

Sept. 14, 1971 Japan .............................. 46-71375
Feb. 2, 1972 Japan .............................. 47-12073

[52] U.S. Cl. ............................ 260/42.45; 156/334; 260/42.14; 260/42.46
[51] Int. Cl.² .......................................... C08K 3/20

[58] Field of Search .......... 260/42.14, 42.45, 42.46

[56] References Cited

UNITED STATES PATENTS

| | | | |
|---|---|---|---|
| 3,342,771 | 9/1967 | Cheritat et al. ................ | 260/42.46 |
| 3,468,753 | 9/1969 | Vincent et al. ................. | 260/42.46 |
| 3,471,439 | 10/1969 | Bixler et al. .................... | 260/42.14 |
| 3,956,230 | 5/1976 | Gaylord ........................... | 260/42.46 |

*Primary Examiner*—James H. Derrington
*Attorney, Agent, or Firm*—Sughrue, Rothwell, Mion, Zinn & Macpeak

[57] ABSTRACT

A polyolefin composition having high adhesive strength comprising a reaction product of (1) a crystalline polyolefin, (2) at least one compound selected from the group consisting of unsaturated aliphatic carboxylic acids and anhydrides thereof and (3) magnesium oxide, and a process for preparing the polyolefin composition are disclosed.

7 Claims, No Drawings

POLYOLEFIN COMPOSITION AND PROCESS FOR PREPARING THE SAME

CROSS-REFERENCE TO RELATED APPLICATIONS

This application is a continuation-in-part application of co-pending application, Ser. No. 287,167, filed Sept. 7, 1972, now abandoned.

BACKGROUND OF THE INVENTION

1. Field of the Invention

This invention relates to a polyolefin composition which is remarkably improved in its adhesiveness to a wide variety of substrates, in particular, to metals, and a process for preparing such polyolefin composition.

2. Description of the Prior Art

Polyolefins, for example, polyethylene, polypropylene, etc. are known to have various excellent properties and are presently used in a wide variety of applications. However, polyolefins possess disadvantages in that the adhesion of polyolefins to metals or other substrates is very difficult because of their non-polarity. In particular, the adhesion is found to be more difficult in highly crystalline polyolefins or in polyolefins which tend to form a layer having a mechanically weak adhesive strength on the surface of the articles, and their utilities are thus remarkably limited. In order to eliminate the above disadvantage various procedures have been proposed, including pre-treatment of the bonding surface of polyolefins with acids, flame, corona discharge, etc., and the use of a primer such as an ethylene-acrylic acid copolymer between the surfaces of the substrate and the polyolefin to be bonded. Also, it is known that the adhesive strength can be improved by blending a polyolefin with a specific polymer having good adhesiveness to the substrates to be bonded or by copolymerizing an olefin and a comonomer which contains functional groups having adhesiveness to the substrates to be bonded, or the like. However, these known procedures are still not satisfactory in practical use because they sometimes do not provide a sufficient adhesive strength, or, in some cases, they adversely affect the advantageous properties of the polyolefins, or they are not economically advantageous.

SUMMARY OF THE INVENTION

An object of this invention is to provide a crystalline polyolefin composition having excellent melt-adhesiveness to a wide variety of substrates, in particular, metals such as iron, steel, copper, zinc, aluminum, tin and the like.

Another object of this invention is to provide a process for preparing a crystalline polyolefin composition which is easily practiced in industry.

As a result of extensive investigations on the above objects, it was found that a synergistic effect on the adhesiveness of a crystalline polyolefin can be obtained when an unsaturated aliphatic carboxylic acid or an anhydride thereof and magnesium oxide as modifiers are incorporated into the crystalline polyolefin.

More particularly, this invention relates to a process which comprises incorporating, based on the weight of the crystalline polyolefin, (1) 0.1 to 10% by weight of at least one compound selected from the group consisting of an unsaturated aliphatic carboxylic acid and an anhydride thereof and (2) magnesium oxide, into a crystalline polyolefin, and reacting the components in the resulting composition at a temperature of greater than the melting point of the crystalline polyolefin.

In the present invention, the term "crystalline polyolefin" as used throughout the specification and claims includes monoolefin polymers such as low density polyethylene, medium density polyethylene, high density polyethylene, polypropylene, polybutene-1 or the like, olefin copolymers such as a copolymer of ethylene and propylene, a block copolymer of ethylene and propylene, a copolymer of ethylene and butene, or the like and a mixture of the above polymers and/or copolymers, as well as a mixture of the above polymers and/or copolymers and a small amount of a rubbery substance. With respect to adhesiveness, polypropylene is most preferable.

The unsaturated carboxylic acids and anhydrides thereof which can be used as a modifier in the present invention include maleic acid, fumaric acid, itaconic acid, citraconic acid, crotonic acid, isocrotonic acid, mesaconic acid, angelic acid, methacrylic acid, acrylic acid and meleic anhydride, itaconic anhydride, citraconic anhydride of the like, with the preferred modifier being maleic anhydride.

Various considerations have been made on an inorganic compound used as a third component, as a result it has been found that magnesium oxide is most preferred from the three stand points of imparting an adhesive force, easy preparation and easy availability as a fine powder.

Magnesium oxide which can be used in the present invention is preferably in the form of a finely divided powder.

In carrying out the present invention, the polyolefin and the unsaturated carboxylic acid or an anhydride thereof are preferably used in a finely divided form, but any form can also be used so long as they are applicable to the modification procedures hereinafter described.

Various procedures can be employed for incorporating two types of the modifiers of an unsaturated carboxylic acid or anhydride thereof and a magnesium oxide into a polyolefin followed by the reaction with each other to obtain the composition of this invention. For example, the procedure which can be used in the present invention comprises heat-mixing a polyolefin and one of the above modifiers, respectively, and combining the resulting mixtures together followed by a heat-reaction, or mixing together the polyolefin and the two modifiers followed by a heat-reaction, or previously mixing the two modifiers and adding the resulting mixture of modifiers to the polyolefin followed by a heat-reaction. However, in either case, the heat-reaction in the final step is carried out at a temperature of greater than the melting point of the polyolefin used, preferably at a temperature of greater than 170° C, in the presence or absence of an appropriate amount of oxygen while blending the mixture.

Although the reaction time somewhat depends upon various conditions, a very short time of from 30 seconds to 10 minutes is preferred. A more preferred reaction time is 1 to 7 minutes. A reaction time of less than 30 seconds decreases the reinforcing effect since the reaction does not occur sufficiently, while more than 10 minutes decreases the reinforcing effect since cross-linking occurs.

A convenient procedure for carrying out the process of this invention on an industrial scale comprises, for example, thoroughly mixing and blending a polyolefin and each of the modifiers in a conventional mixer such as Henschel mixer, a ribbon blender or the like, and melt-blending the resulting mixture using a screw-type extruder of a conventional type to form a pellet, or the procedure comprises melt-blending a polyolefin in a usual Banbury mixer, adding simultaneously a mixture of modifiers to the polyolefin followed by thoroughly blending and finally pelletizing the resulting blend.

The polyolefin composition obtained as above in accordance with the process of this invention is clearly distinguished from a mere mixture of the polyolefin and the modifiers. That is, of these modifiers, at least a portion of the unsaturated carboxylic acid or the anhydride thereof is considered to be bonded to the polyolefin in a graft form. The mechanism of the synergistic effect on the adhesiveness brought about by these two types of modifiers is not at present completely understood, but the unsaturated bond appears to play an important role in the improvement of adhesiveness desired in the present invention since a significant adhesiveness can not be obtained when a saturated carboxylic acid such as adipic acid, sebacic acid or the like is used in place of the specific unsaturated carboxylic acid used in the present invention.

The amount of the unsaturated carboxylic acid or anhydride thereof used in the composition of this invention varies somewhat depending upon the type of the polyolefins and the unsaturated carboxylic acids used, but generally can range from 0.1 to 10% by weight based on the weight of the polyolefin. An excessively small amount of unsaturated carboxylic acid does not produce a satisfactory effect. On the other hand, an excessively large amount of the acids is not preferred in view of the fact that the unreacted carboxylic acid remaining in the polyolefin adversely affects not only the practical use but also the original properties of the polyolefin or, in some cases, a remarkable increase in the melt viscosity of the polymer due to the cross-linking reaction occurs thereby resulting in a decrease of the melt adhesiveness of the polyolefin composition.

Hithertofore, it is well known that the mechanical properties, optical properties, etc. of carboxylic acid-modified polyolefins can be improved by ionic cross-linkage with a water-soluble ionic metal compound as disclosed, for example, in Japanese Patent Publication Nos. 6810/1964 and 27420/1968. Also, it is known that the polymer obtained by the ionic cross-linking reaction of this type exhibits a certain degree of adhesiveness. However, for the purpose of improving the melt-adhesiveness of crystalline polyolefinss as in the composition of this invention, it is found that magnesium oxide which is not believed to be suitable for an ionic cross-linking reaction is more effective than the metal compounds which have been proved to be effective for ionic cross-linking. For example, as is shown hereinafter in the Examples, a composition having an adhesive strength of more than 30 Kg/25 mm to an aluminum plate can be obtained in accordance with the present invention, but no apparent ionic cross-linking reaction is observed in this composition. In the ionic cross-linking reaction, a reaction between the unsaturated carboxylic acid and a water-soluble metal compound as a cross-linking agent occurs predominantly when the acid and the metal compound are added simultaneously to a polyolefin whereby the desired effect almost cannot be obtained in the resulting polyolefin composition, whereas in the composition of the present invention, the adhesiveness of the final polyolefin composition is not adversely affected even when a mixture of modifiers comprising both modifiers previously blended is added to a polyolefin. The above fact is recognized to be an excellent advantage in preparing the composition on an industrial scale.

A correlation exists between the amounts of the two modifiers with respect to the maximum adhesiveness obtained with the composition in accordance with the process of this invention. This maximum adhesiveness somewhat varies depending upon the types of the polyolefin and the modifiers, but is generally attained by using the magnesium oxide in an amount of from 5 to 20% by weight based on the weight of the polyolefin. However, it is to be understood that a higher or lower amount of the magnesium oxide can be used to obtain a composition having a satisfactory adhesiveness in practical use.

In the composition of the present invention, the magnesium oxide incorporated therein is dispersed in the polyolefin as fine particulate solids. When the magnesium oxide is employed to obtain the adhesive effect and as a filler, the magnesium oxide can be used up to about 80% by weight. It will be apparent, however, to those skilled in the art that the addition of a large amount of the magnesium oxide will impair to some extent the transparency and other properties of the polyolefin per se.

Thus, the most preferred amount of the modifiers in order to maintain the original properties of the polyolefin as much as possible and to ensure a satisfactory adhesiveness ranges from 0.5 to 5% by weight of an unsaturated aliphatic carboxylic acid or an anhydride thereof and from 1 to 15% by weight of magnesium oxide, based on the weight of the polyolefin.

A feature of the present invention resides in that the above described two modifiers of the unsaturated aliphatic carboxylic acid or an anhydride thereof and the magnesium oxide exhibit an excellent synergistic effect in improving the adhesiveness of a polyolefin. In this connection, it is known that some adhesive effects can be accomplished using modifiers individually. For example, an inorganic compound having a sulfate radical such as calcium sulfate, magnesium sulfate and the like is known to improve the adhesiveness of polyolefins to metals when it is incorporated into the polyolefins, as disclosed in Japanese Patent Publication No. 5147/1970. Also, it is known that unsaturated carboxylic acids can be used as a modifier for improving the dyeability and adhesiveness of polyolefins, as disclosed in Japanese Patent Publication Nos. 23032/1965, 10727/1967, 32356/1970 and others.

However, the polyolefin to which the above compounds are added individually shows only a slight degree of adhesive effect in comparison with the corresponding polyolefin without such additives and a practically useful adhesiveness cannot be obtained. For example, when polyolefin compositions into which one of the above additives is incorporated are melt-adhered to an aluminum or steel plate and the resulting laminates are subjected to a peeling test at room temperature, it was found that the polyolefin film is peeled at the boundary surface between the polymer and the metal plate and the peeling strength (based on the criteria given in JIS K6744-1963) is only less than 3.5 Kg/25 mm in each case. It was also found that, when the above laminates are dipped in water containing surface active agents or subjected to rapid heat change cycles the polymer spontaneously peels from the metal plate in most of the cases.

On the contrary, the composition prepared in accordance with the present invention wherein two types of modifiers are reacted with a polyolefin exhibits, in most of the cases, a significantly increased adhesive strength, i.e., a peeling strength of greater than 15 Kg/25 mm. Also, when the laminates using the composition of this invention are subjected to a peeling test, the polymer film is peeled with a break in the surface phase of polymer film, and the peeling strength is not substantially decreased even after the laminates are subjected to the above severe durability test. This clearly indicates that the two types of modifiers have a synergistic effect on the adhesive strength in the composition of this invention.

Another feature of the present invention is that the composition of the present invention can retain the original properties of the polyolefin contained therein. As a method for improving the adhesiveness of polyolefins, it is known that an olefin is copolymerized with a different monomer having functional groups which serve to provide the adhesiveness such as acrylic acid, vinyl acetate or the like. However, the physical properties such as thermal properties, hardness, stiffness, etc. of the resulting copolymers are generally decreased due to the fact that the crystallinity of the copolymers is significantly decreased whereby the original advantages of the monoolefin polymer are deteriorated. On the contrary, in the composition of the present invention, it is possible to provide the composition with remarkable adhesiveness by appropriately selecting the type and the amount of the two modifiers as set forth above, without causing a loss of the original advantages of the polyolefins. Accordingly, the process of this invention is particularly useful for polyolefine such as a high density polyethylen, isotactic polypropylene and the like which have excellent thermal properties and stiffness.

The compositions obtained in accordance with the process of this invention exhibit excellent adhesiveness to not only polyolefin articles but also to metals such as aluminum, iron, copper, steel, zinc, tin, and the like. They also exhibit an improved adhesiveness to the other substrates, for example, paper, wood, textiles and synthetic resins. Thus, the compositions of this invention are useful not only as a composite material for different type of materials but also for a wide variety of utilities by taking advantage of the adhesiveness as a surface coating agent for metals, an adhesive for bonding a metal to a synthetic resin which cannot be bonded directly to the metal. Further, each additives as coloring agents, stabilizers, foaming agents and the like can also be incorporated into the composition of this invention according to its utility without reducing the adhesiveness of the composition. However, it should be noted that some of these additives tend to adversely affect the modification reaction in the process of this invention and, therefore, it is preferred to incorporate the additives into the composition after completion of the modification reaction.

The present invention is further illustrated in greater detail by the following examples, but they are not to be construed as limiting the invention. All percentages used herein are given by weight. The adhesiveness was evaluated in accordance with the following test procedure at 180° peeling strength based on the criteria given in JIS K6744-1963.

TEST PROCEDURE (JIS K6744-1963)

Test samples were prepared by melt-adhering a polymer having a thickness of 1 mm on an aluminum plate of a thickness of 0.3 mm or a steel plate of a thickness of 0.1 mm (previously washed with trichloroethylene) using a hot-press molder followed by rapid cooling, and cutting the resulting laminate in a width of 25 mm. These samples were tested after allowing the samples to stand at room temperature for 72 hours from their preparation.

The 180° peeling test was conducted by peeling the polymer film from the metal plate at a rate of 100 mm per minute at a temperature of 23° C and at a relative humidity of 50%, using an Instron type tensile tester.

EXAMPLE 1

A high density polyethylene powder having a [$\eta$] of 1.5 and a density of 0.965 (at 20° C), to which maleic anhydride had been added in an amount of 0.1, 0.5, 1.0, 5.0 and 10.0%, respectively, was mixed for 2 minutes in a hot roll heated at a temperature of 180° C. To each of the resulting mixtures was added magnesium oxide in an amount of 5.0% by weight, followed by blending each of the mixtures for an additional three minutes. 2,6-Di-tert-butyl-p-cresol(hereinafter referred to as BHT) as an antioxidant was then added to each of the mixtures in an amount of 0.2% by weight, and the mixtures thus obtained were then pelletized. Thereafter, the mixtures were melt-adhered to aluminum plates using a heat-press molder which was set at 190° C to prepare samples, which were then tested (Sample Nos. 1 to 5). For the purposes of comparison, samples containing only maleic anhydride in an amount of 0.1, 1.0 and 10.0% by weight, respectively (Sample Nos. 7 to 9) and a sample containing only magnesium oxide in an amount of 5.0% by weight (Sample No. 10) as well as a sample containing no modifier (Sample No. 6) were also prepared and tested in the same manner as above after being blended in a hot roll. The results obtained are shown in Table 1 below.

Table 1

| Sample No. | Modifiers | | 180° Peeling Strength |
|---|---|---|---|
| | Maleic Anhydride | Magnesium Oxide | |
| | (% by weight) | (% by weight) | (Kg/25 mm) |
| 1 | 0.1 | 5.0 | 16.1 |
| 2 | 0.5 | 5.0 | 17.0 |
| 3 | 1.0 | 5.0 | 18.0 |
| 4 | 5.0 | 5.0 | 17.5 |
| 5 | 10.0 | 5.0 | 17.5 |
| 6 | — | — | ~0 |
| 7 | 0.1 | — | ~0 |
| 8 | 1.0 | — | 2.5 |
| 9 | 10.0 | — | 2.0 |
| 10 | — | 5.0 | ~0 |

As is clear from the results contained in Table 1 above, some of the samples to which one of the modifiers has been added show a slightly improved adhesiveness in comparison with those containing no modifier, but the peeling strength of each of the samples is found to be as low as below 3 Kg/25 mm. On the contrary, the samples which contain a combination of both modifiers show an extremely increased peeling strength.

EXAMPLE 2

An isotactic polypropylene powder having a [$\eta$] of 2.0 and a II (hot heptane insoluble portion) of 97%, to which maleic acid, itaconic acid or itaconic anhydride had been added in an amount of 2.0% by weight, was mixed for 2 minutes in a hot roll heated at a temperature of 190° C. To each of the resulting mixtures was added magnesium oxide in an amount of 5.0% by weight, followed by blending the mixture for an additional 3 minutes. BHT as an antioxidant was then added in an amount of 0.2% by weight to each of the mixture. The thus obtained mixtures were melt-adhered to aluminum plates using a heat-press molder set at 210° C to prepare the samples which were then tested (Sample Nos. 1 to 3). Also, for the purpose of comparison, succinic acid, adipic acid and sebacic acid were added, respectively, to the above magnesium oxide-containing polypropylene in an amount of 2.0% by weight to prepare samples (Sample Nos. 4 to 6). These samples were then tested in the same manner as described above and the results obtained are shown in Table 2.

Table 2

| Sample No. | Modifiers Carboxylic Acid | | Magnesium Oxide | 180° Peeling Strength |
|---|---|---|---|---|
| | | (% by weight) | (% by weight) | (Kg/25 mm) |
| 1 | Maleic Acid | 2.0 | 5.0 | 16.8 |
| 2 | Itaconic Acid | 2.0 | 5.0 | 14.6 |
| 3 | Itaconic Anhydride | 2.0 | 5.0 | 15.8 |
| 4 | Succinic Acid | 2.0 | 5.0 | ~0 |
| 5 | Adipic Acid | 2.0 | 5.0 | ~0 |
| 6 | Sebacic Acid | 2.0 | 5.0 | ~0 |

As is apparent from the results contained in Table 2, the samples containing a combination of magnesium oxide and an unsaturated carboxylic acid or an anhydride thereof show a high peeling strength, whereas the samples containing a saturated carboxylic acid only exhibit no substantial improvement in adhesiveness.

EXAMPLE 3

An isotactic polypropylene powder having a [$\eta$] of 2.0 and a II of 97% to which maleic anhydride had been added in an amount of 2.0% by weight was used to prepare the samples in the same manner as described in Example 2 by further adding the metal compounds shown in Table 3 in the amount indicated in the Table, respectively (Sample Nos. 1 to 9). Also, samples were prepared for the purposes of comparison using the same polypropylene to which maleic acid or a metal compound had been added separately (Sample Nos. 10 to 18). These samples were then tested as described previously and the results obtained are shown in Table 3.

Table 3

| Sample No. | Modifier Maleic Anhydride | Inorganic Metal Compound | | 180° Peeling Strength |
|---|---|---|---|---|
| | (% by weight) | (% by weight) | | (Kg/25 mm) |
| 1 | 2.0 | Magnesium Oxide | 5.0 | 19.0 |
| 2 | 2.0 | Titanium Dioxide | 5.0 | 7.3 |
| 3 | 2.0 | Aluminum Oxide | 5.0 | 5.0 |
| 4 | 2.0 | Calcium Carbonate | 5.0 | 5.4 |
| 5 | 2.0 | Aluminum Sulfate | 5.0 | 6.1 |
| 6 | 2.0 | Barium Sulfate | 5.0 | 6.4 |
| 7 | 2.0 | Magnesium Sulfate | 5.0 | 7.4 |
| 8 | 2.0 | Calcium Sulfate | 5.0 | 14.3 |
| 9 | 2.0 | Magnesium Carbonate | 5.0 | 17.0 |
| 10 | 2.0 | — | | ~0 |
| 11 | — | Magnesium Oxide | 5.0 | ~0 |
| 12 | — | Titanium Dioxide | 5.0 | ~0 |
| 13 | — | Calcium Carbonate | 5.0 | ~0 |
| 14 | — | Aluminum Sulfate | 5.0 | ~0 |
| 15 | — | Barium Sulfate | 5.0 | ~0 |
| 16 | — | Magnesium Sulfate | 5.0 | ~0 |
| 17 | — | Calcium Sulfate | 5.0 | 3.1 |
| 18 | — | Calcium Sulfate | 20.0 | 3.4 |

As is clear from the results in Table 3, the samples to which a modifier has been added separately show almost no or a very low adhesiveness and the other reference samples also show low adhesiveness, whereas the samples prepared in accordance with the present invention are found to have a remarkably improved peeling strength.

EXAMPLE 4

Into a high density polyethylene powder having a [$\eta$] of 1.5 and a density of 0.965 to which maleic anhydride had been added in an amount of 1.0% by weight was incorporated each of the metal compounds shown in Table 4 below in the amount indicated in the Table. The resulting compositions were then melt-adhered to steel plates in the same manner as described in Example 1, and the resulting samples were subjected to the peeling test (Sample Nos. 1 to 4). The results obtained are shown in Table 4, together with the test results obtained from the samples to which a modifier had been added separately (Sample Nos. 5 to 11). In these instances, the samples containing both the maleic anhydride and the metal compound show an excellent adhesiveness, whereas the samples containing only one modifier show almost no or a very low adhesiveness, as previously shown in Example 3.

Table 4

| Sample No. | Modifier Maleic Anhydride | Metal Compound | | 180° Peeling Strength |
|---|---|---|---|---|
| | (% by weight) | (% by weight) | | (Kg/25 mm) |
| 1 | 1.0 | Magnesium Oxide | 5.0 | 17.8 |
| 2 | 1.0 | Titanium Dioxide | 5.0 | 12.3 |
| 3 | 1.0 | Aluminum Oxide | 5.0 | 12.3 |
| 4 | 1.0 | Calcium Carbonate | 5.0 | 9.1 |
| 5 | — | — | | ~0 |
| 6 | 1.0 | — | | 2.1 |
| 7 | — | Magnesium Oxide | 5.0 | ~0 |
| 8 | — | Magnesium Oxide | 20.0 | 1.1 |
| 9 | — | Titanium Dioxide | 5.0 | ~0 |
| 10 | — | Aluminum Oxide | 5.0 | ~0 |
| 11 | — | Calcium Carbonate | 5.0 | ~0 |

EXAMPLE 5

To a high density polyethylene powder having a $[\eta]$ of 1.5 and a density of 0.965 were added maleic anhydride in an amount of 1.0% and magnesium oxide in an amount of 5.0%, and the resulting mixture was blended and extruded from a 40 mm extruder set at 185° C to prepare a pellet. An antioxidant, BHT, in an amount of 0.2% and a coloring agent, phthalocyanine blue, in an amount of 0.5% were then added to the pellet, and the mixture was then re-pelletized in the same manner as above. Also, a pellet containing no antioxidant and coloring agent, a pellet containing each of the modifiers, and a pellet containing no additive (antioxidant and coloring agent) and modifier were prepared in the same manner as above. These pellets were then melt-adhered to aluminum plates using a hot press set at 190° C, and the resulting samples were subjected to the peeling test. The peeling strength was determined with respect to a sample which had been allowed to stand for 72 hours after the preparation (no durability test), a sample which had been dipped in a 10;1 % aqueous solution of a surface active agent (Antarox-CO-630 available from General Aniline & Film Co.) at a temperature of 30° C for 300 hours (Durability Test A) and a sample subjected to 50 cycles of rapid temperature change from −70° C to 100° C (Durability Test B). The results obtained are shown in Table 5 below.

Table 5

| Sample No. | Modifier | | Additives | | 180° Peeling Strength Durability Test | | |
|---|---|---|---|---|---|---|---|
| | Maleic Anhydride | Magnesium Oxide | BHT | PCB* | None | A | B |
| | (% by weight) | | (% by weight) | | (Kg/25 mm) | | |
| 1 | 1.0 | 5.0 | — | — | 19.2 | 18.7 | 19.1 |
| 2 | 1.0 | 5.0 | 0.2 | 0.5 | 18.8 | 18.2 | 18.0 |
| 3 | — | — | — | — | 0 | SP** | SP |
| 4 | 1.0 | — | — | — | 2.0 | SP | SP |
| 5 | — | 5.0 | — | — | 0 | SP | SP |

*Phthalocyanine Blue
**Spontaneously peeled

As is clear from the results in Table 5, the samples prepared from the composition in accordance with the present invention (Sample Nos. 1 and 2) retain a high adhesiveness even after subjection to the severe durability tests and are found not to be adversely affected by the addition of the antioxidant and the coloring agent. On the other hand, the samples containing only one modifier (Sample Nos. 4 and 5) show somewhat improved adhesiveness as compared with that of the sample containing no modifier (Sample No. 3), but are found to have only a very low peeling strength and a spontaneous peeling occurs when this sample is subjected to the above-described durability tests, indicating that a practically valuable adhesive strength cannot be obtained.

EXAMPLE 6

A high density polyethylene powder having a $[\eta]$ of 1.5 and a density of 0.965, to which maleic anhydride had been added in an amount of 2.0% by weight, was mixed for 2 minutes in a hot roll heated at a temperature of 180° C. To the resulting mixture was added magnesium oxide in an amount of 0.5, 5.0, 10.0, 20.0, 50.0 and 70.0% by weight, respectively followed by blending each of the mixtures for an additional 3 minutes. BHT as an antioxidant was then added in an amount of 0.2% by weight to each of the mixtures. Each of the thus obtained mixtures was melt-adhered to aluminum plates using a heat-press molder set at 190° C to prepare samples which were then tested (Sample Nos. 1 to 6). For the purposes of comparison, samples containing each of the modifiers in the amount indicated in Table 6 below (Sample Nos. 8 to 11) and a sample without any modifier (Sample No. 7) were also prepared and tested in the same manner as above after being blended for 5 minutes in a hot roll. The results obtained are shown in Table 6 below.

Table 6

| Sample No. | Modifiers | | 180° Peeling Strength |
|---|---|---|---|
| | Maleic Anhydride | Magnesium Oxide | |
| | (% by weight) | (% by weight) | (Kg/25 mm) |
| 1 | 2.0 | 0.5 | 12.5 |
| 2 | 2.0 | 5.0 | 18.5 |
| 3 | 2.0 | 10.0 | 18.7 |
| 4 | 2.0 | 20.0 | 19.0 |
| 5 | 2.0 | 50.0 | 16.5 |
| 6 | 2.0 | 70.0 | 13.0 |
| 7 | — | — | ~0 |
| 8 | 2.0 | — | ~0 |
| 9 | — | 0.5 | ~0 |
| 10 | — | 10.0 | ~0 |
| 11 | — | 70.0 | ~0 |

As is clear from the results contained in Table 6, the samples containing a combination of two modifiers exhibit a high peeling strength, whereas the samples containing only one of the modifiers are found to show almost no improvement in the peeling strength.

While the invention has been described in detail and in terms of specific embodiments thereof, it will be apparent to one skilled in the art that various changes and modifications can be made therein without departing from the spirit and scope thereof.

What is claimed is:
1. A process for preparing a polyolefin composition having high adhesive strength which comprises reacting together for 30 seconds to 10 minutes (1) a crystalline polyolefin, (20 at least one unsaturated acid component selected from the group consisting of unsaturated aliphatic carboxylic acids and anhydrides thereof and (3) magnesium oxide in an amount of from 5 to 20% by weight based on the weight of the polyolefin, at a temperature above the melting point of said polyolefin.
2. The process according to claim 1, wherein said unsaturated aliphatic carboxylic acids and anhydrides thereof is present in an amount of from 0.1 to 10% by weight based on the weight of said polyolefin.
3. The process according to claim 1, wherein said reacting is at a temperature of greater than 170° C.
4. The process of claim 1, wherein said unsaturated acid component is maleic anhydride.
5. The process according to claim 1, wherein said crystalline polyolefin is polypropylene.
6. A polyolefin composition produced in accordance with the process claimed in claim 1.
7. A polyolefin composition produced in accordance with the process claimed in claim 4.

* * * * *